(12) United States Patent
Nishio et al.

(10) Patent No.: US 10,270,322 B2
(45) Date of Patent: Apr. 23, 2019

(54) LAMINATE CARBON BRUSH FOR FUEL PUMP MOTOR

(71) Applicant: TRIS Inc., Matsusaka (JP)

(72) Inventors: Makoto Nishio, Matsusaka (JP); Yuya Nishino, Matsusaka (JP)

(73) Assignee: TRIS Inc., Matsusaka (JP)

( * ) Notice: Subject to any disclaimer, the term of this patent is extended or adjusted under 35 U.S.C. 154(b) by 348 days.

(21) Appl. No.: 15/322,784

(22) PCT Filed: Jul. 16, 2015

(86) PCT No.: PCT/JP2015/070364
§ 371 (c)(1),
(2) Date: Dec. 29, 2016

(87) PCT Pub. No.: WO2016/010104
PCT Pub. Date: Jan. 21, 2016

(65) Prior Publication Data
US 2017/0163131 A1    Jun. 8, 2017

(30) Foreign Application Priority Data

Jul. 17, 2014  (JP) .................................. 2014-146963

(51) Int. Cl.
*H02K 13/10* (2006.01)
*H02K 13/00* (2006.01)
(Continued)

(52) U.S. Cl.
CPC .............. *H02K 13/10* (2013.01); *H01R 39/22* (2013.01); *H01R 39/24* (2013.01); *H01R 39/46* (2013.01);
(Continued)

(58) Field of Classification Search
CPC ........ H02K 13/10; H02K 13/00; H01R 39/22; H01R 39/24; H01R 39/46; H01R 39/06; H01R 43/12
See application file for complete search history.

(56) References Cited

U.S. PATENT DOCUMENTS 7,015,618 B2 *  3/2006  Kasdorf ............... H01R 39/383
                                                    310/239
7,362,029 B2 *  4/2008  Baempfer ............. F02M 37/10
                                                    310/233

(Continued)

FOREIGN PATENT DOCUMENTS

JP    2003134739 A    5/2003
JP    2005302512 A   10/2005

(Continued)

*Primary Examiner* — Emily P Pham
(74) *Attorney, Agent, or Firm* — The Webb Law Firm

(57) ABSTRACT

A laminated carbon brush for a liquid pump motor slides in a liquid fuel on a disk-like commutator. The laminated carbon brush includes two layers of a lower resistivity layer and a higher resistivity layer. In both the lower resistivity layer and the higher resistivity layer, circular directional resistivities of the brush along a circular direction in the rotation of the commutator are higher than non-circular directional resistivities of the brush along a radial direction of the commutator and a perpendicular direction to the sliding surface of the commutator. A non-circular directional resistivity of the higher resistivity layer are higher than or equal to 90,000 μΩ·cm. No spark discharges occur if the fuel pump motor is operated to output a high power.

12 Claims, 3 Drawing Sheets

(51) Int. Cl.
*H01R 39/22* (2006.01)
*H01R 39/24* (2006.01)
*H01R 39/46* (2006.01)
*H01R 43/12* (2006.01)
*H01R 39/06* (2006.01)

(52) U.S. Cl.
CPC ............ *H01R 43/12* (2013.01); *H02K 13/00* (2013.01); *H01R 39/06* (2013.01)

(56) References Cited

U.S. PATENT DOCUMENTS

| | | |
|---|---|---|
| 7,586,230 B2 | 9/2009 | Hamamatsu et al. |
| 8,011,902 B2 * | 9/2011 | Nagase ................. F02D 41/065 318/244 |
| 2002/0070625 A1 | 6/2002 | Katoh et al. |
| 2003/0155837 A1 | 8/2003 | Takahashi et al. |
| 2005/0223538 A1 | 10/2005 | Sperling et al. |
| 2008/0067888 A1 * | 3/2008 | Il ............................ F04D 5/002 310/245 |

FOREIGN PATENT DOCUMENTS

| | | |
|---|---|---|
| JP | 2006187190 A | 7/2006 |
| JP | 2007325401 A | 12/2007 |
| JP | 2012050276 A | 3/2012 |
| KR | 1020040104477 A | 12/2004 |
| WO | 2004075373 A2 | 9/2004 |

* cited by examiner

LAMINATE CARBON BRUSH FOR FUEL PUMP MOTOR

CROSS-REFERENCE TO RELATED APPLICATIONS

This application is the United States national phase of International Application No. PCT/JP2015/070364 filed Jul. 16, 2015, and claims priority to Japanese Patent Application No. 2014-146963 filed Jul. 17, 2014, the disclosures of which are hereby incorporated in their entirety by reference.

BACKGROUND OF THE INVENTION

Field of the Invention

The present invention relates to a laminated carbon brush for a fuel pump motor.

Description of the Related Art

Carbon brushes for fuel pump motors are used in liquid fuels and slide on commutators. The liquid fuel exists between the brush and the commutator, and electrical contacts between them are unstable. Therefore, spark discharges occur often between the brush and the commutator, particularly at the sliding end where the brush and one segment of the commutator become separated. The spark discharges make the respective sliding ends of the brush and the commutator damaged and dropped off, and therefore, the sliding surfaces of them become uneven. Then, the contacts between them become further unstable, and the larger spark discharges occur. Thus, the brush and the commutator rapidly and abnormally wear, namely, resulting in the so-called "abnormal wear." The service life of the brush and the commutator is one of the most important functions of fuel pumps. However, because a wide variety of species of fuels have been used recently, and because the fuel pump motors have been miniaturized in size and requested high outputs, the fuel pump motors have often been used under high-load. Therefore, it is necessary to prevent abnormal wears due to the spark discharges.

The fundamental measure to the prevent abnormal wears is to suppress the occurrence of spark discharges. In order to prevent abnormal wears, various additives into the brushes or the commutators have been studied. However, the improvement in the wear resistance and the suppression of the spark discharges are not the same.

The related prior art will be described. Patent Literature 1 (JP 2012-50276A) proposes a two layer resin bonded laminated carbon brush comprising the lower resistivity layer and the higher resistivity layer. Here, "resin bonded" means that an uncarbonized synthetic resin acts as the binder. Carbon brushes have anisotropy in the resistivity determined by the press direction during molding; generally, the resistivity along the press direction is high, and the resistivity in a plane perpendicular to the press direction is low. The carbon brush according to Patent Literature 1 slides on a cylindrical commutator; its resistivity along the axial direction of the commutator is made high, and the resistivity along a direction perpendicular to the axial direction is made low. The resistivity of the higher resistivity layer is 71,000 μΩ·cm along the circular direction of the commutator, for example, and is 760,000 μΩ·cm along the axial direction, for example. Note that the carbon brush according to Patent Literature 1 is not for fuel pump motors, and the spark discharges are not taken into consideration.

CITATION LIST

Patent Literature

Patent Literature 1: JP 2012-50276A

SUMMARY OF THE INVENTION

Problem to be Solved by the Invention

The problem to be solved by the present invention is to prevent spark discharges and abnormal wears of a laminated carbon brush in liquid fuels.

Means for Solving Problem

The laminated carbon brush for a liquid pump motor according to the present invention slides on a sliding surface of a disk-like commutator in a liquid fuel and comprises:

at least two layers of a lower resistivity layer and a higher resistivity layer, wherein regarding both the lower resistivity layer and the higher resistivity layer, circular directional resistivities of the brush along a circular direction in the rotation of the commutator are higher than non-circular directional resistivities of the brush along a radial direction of the commutator and along a perpendicular direction to the sliding surface of the commutator, and wherein a non-circular directional resistivity of the higher resistivity layer is higher than or equal to 90,000 μΩ·cm.

The laminated carbon brush for a liquid pump motor (carbon brush) according to the present invention has at least two layers that include the higher resistivity layer at the rear end side along the sliding direction and the lower resistivity layer at the front end side along the sliding direction. Note that the carbon brush may include three or more layers where another higher resistivity layer is provided at the front end side and the lower resistivity layer is provided at the central portion along the sliding direction. The higher resistivity layer is provided at the rear end along the sliding direction so that the resistance between the carbon brush and a segment of the commutator gradually increases when the carbon brush leaves the segment, and thus the spark discharges are prevented. Note that laminated carbon brushes per se are well-known.

The addition of the front and rear relation according to the sliding motion of the commutator to the circular direction of the commutator results in the sliding direction. A direction perpendicular to the circular direction is the non-circular direction and the radial direction of the commutator. The direction orthogonal to the sliding surface are both the non-circular directions. The resistivity of the carbon brush is related to the press direction during molding. Along the direction parallel to the press direction, the resistivity is high, and the press direction is made of, for example, parallel to the circular direction in use. Along the directions perpendicular to the press direction, the resistivity is low, and these directions are the non-circular direction in use. The resistivity along the two perpendicular directions to the press direction is the same basically, and therefore, the resistivity along non-circular directions, the radial direction of the commutator and the orthogonal direction to the sliding surface, is the same basically.

The carbon brush has the higher resistivity layer at its rear end along the sliding direction, and, in both the lower resistivity layer and the higher resistivity layer, the circular directional resistivities are higher than the non-circular directional resistivities. Therefore, the electrical conductivity of the path extending along the circular direction toward the rear end of the carbon brush along the sliding direction is low. Preferably, the commutator is circular and disk-like, and the sliding surface of the commutator is circular. Further preferably, the sliding surface of the commutator is made of carbon, and the commutator is divided into a plurality of segments along the radial direction of the circular disk.

According to the present invention, the circular directional resistivity of the carbon brush, i.e., the resistivity along the circular direction of the commutator, is made higher than both the resistivity along the radial direction of the commutator and the resistivity along the perpendicular direction to the surface of the commutator. The carbon brush has anisotropy in the resistivity depending on the press direction. When pressing parallelly to the circular direction of the commutator, the resultant resistivity along the circular direction is four times or higher than the resistivity along non-circular directions. By making the resistivity along the circular direction high, the electrical current flowing from the lower resistivity layer to the segments of the commutator via the higher resistivity layer is reduced, and thus spark discharges are suppressed.

As shown in FIG. 4, by increasing the resistivity of the higher resistivity layer (the resistivity along a non-circular direction), the spark energy is reduced when the carbon brush is built into a fuel pump motor. In particular, by increasing the resistivity of the higher resistivity layer from 70,000 $\mu\Omega\cdot cm$ to 100,000 $\mu\Omega\cdot cm$, the spark discharges are completely prevented. Although the upper limit of the resistivity does not have significant meaning, an insulative layer does not work as the higher resistivity layer. Therefore, the resistivity is, for example, made lower than or equal to 800,000 $\mu\Omega\cdot cm$, and specifically made lower than or equal to 500,000 $\mu\Omega\cdot cm$. The resistivity of the higher resistivity layer along the circular direction is, for example, twice or higher than the resistivity along the non-circular directions and is approximately five times higher. The resistivity of the higher resistivity layer along the circular direction is higher than the resistivity along the non-circular directions, is preferably lower than or equal to 4,000,000 $\mu\Omega\cdot cm$, for example, and is particularly preferably lower than or equal to 2,500,000 $\mu\Omega\cdot cm$.

Preferably, the higher resistivity layer contains at least an insulative inorganic layered compounds such as talc, molybdenum disulfide, tungsten disulfide, boron nitride, molybdenum trioxide, mica, kaolin, and smectite. One kind of the insulative inorganic layered compound or plural kinds of insulative inorganic layered compounds may be contained. Smectite is, for example, montmorillonite, beidellite, nontronite, saponite, hectorite, sauconite, or stevensite. The insulative inorganic layered compounds are unlikely to wear the brush or the commutator due to their low hardness and make the resistance of the higher resistivity layer higher due to their insulating properties. Among the insulative inorganic layered compounds, talc, molybdenum disulfide, tungsten disulfide, boron nitride, molybdenum trioxide, mica, kaolin, and smectite are low in the hardness and are stable in gasoline and alcohol. The stability not only in gasoline but also in alcohol is required for fuels containing alcohol.

A self-lubricating insulative inorganic layered compound in the higher resistivity layer further reduces wears of the brush and the commutator. Examples of such a material include talc, molybdenum disulfide, tungsten disulfide, boron nitride, molybdenum trioxide, and mica.

The resistivity of the higher resistivity layer may be increased by adding the insulative inorganic layered compound as a powder, for example. Also, the resistivity may be changed by, for example, adding amorphous carbon to graphite, changing the particle size of graphite or amorphous carbon, and changing the resin binder content. In order to make the non-circular directional resistivity of the higher resistivity layer higher than or equal to 100,000 $\mu\Omega\cdot cm$, no less than 10 mass % and no greater than 70 mass % of the above-described additives may be included in the higher resistivity layer. The best additive out of the above is talc having a low hardness.

Preferably, both the lower resistivity layer and the higher resistivity layer contain thermoplastic resin, particularly one having thermal durability and chemical durability to gasoline and alcohol, such as polyphenylene sulfide (PPS), polyether ether ketone (PEEK), polytetrafluoroethylene (PTFE), polyoxymethylene (POM), or polyimide (PI), as the binder. These thermoplastic resins are thermally stable because of high thermal durability, are highly durable in gasoline and alcohol, and are suitable for use in a liquid fuel.

The resistivity of the lower resistivity layer is preferably low, the non-circular directional resistivity of the lower resistivity layer is preferably lower than or equal to 10,000 $\mu\Omega\cdot cm$, for example, particularly preferably, no lower than 500 $\mu\Omega\cdot cm$ and no higher than 10,000 $\mu\Omega\cdot cm$. The circular directional resistivity of the lower resistivity layer is, for example, approximately five times the non-circular directional resistivity, is preferably lower than or equal to 50,000 $\mu\Omega\cdot cm$, for example, and is, more preferably, no lower than 2500 $\mu\Omega\cdot cm$ and no higher than 50,000 $\mu\Omega\cdot cm$.

Advantageous Effects of the Invention

According to the present invention, abnormal wears of both the laminated carbon brush and the commutator in a fuel pump motor are prevented by preventing the spark discharges.

DETAILED DESCRIPTION OF THE PREFERRED EMBODIMENTS

The best embodiment for carrying out the present invention is described in the following. The present invention should not be limited to the embodiment and should be construed based on the claims to include modifications of the embodiments with known matters in the art.

Embodiment

Structure of Laminated Carbon Brush for Fuel Pump Motor

Figure 1:
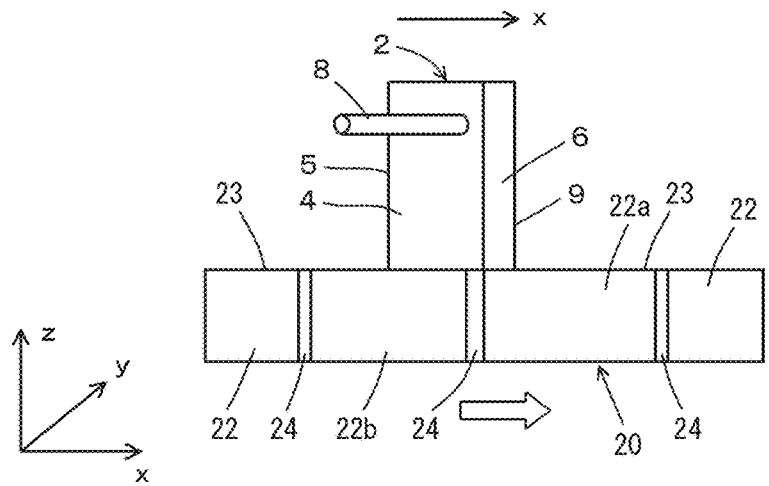
FIG. 1 is a side view showing a laminated carbon brush for a fuel pump motor according to an embodiment together with a commutator.
Figure 2:
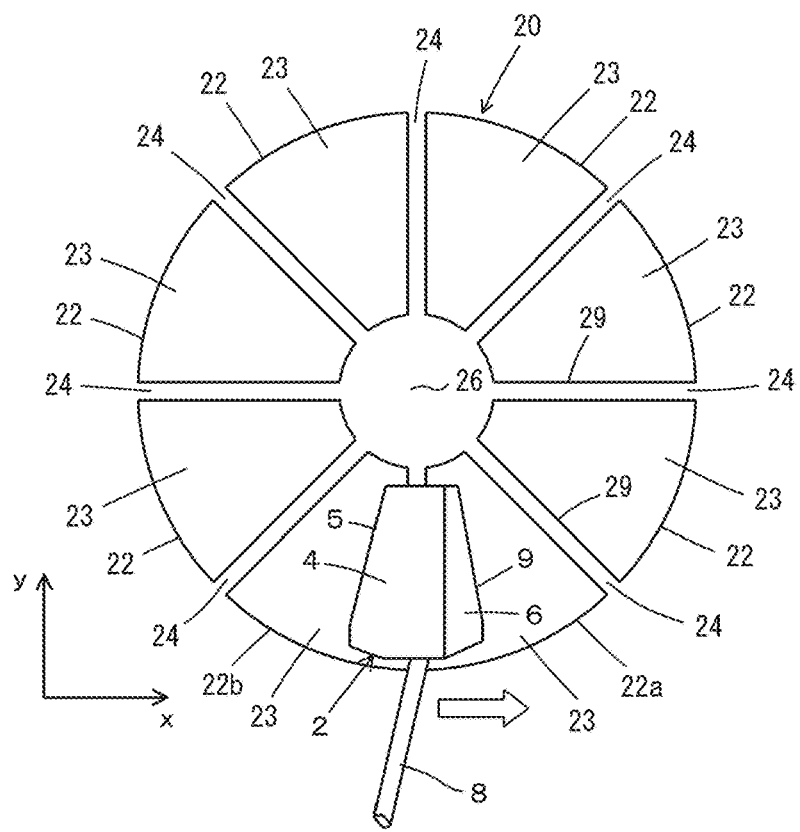
FIG. 2 is a plan view showing the laminated carbon brush for a fuel pump motor according to the embodiment together with the commutator.

FIG. 1 and FIG. 2 show a laminated carbon brush for a fuel pump motor (a carbon brush) 2 and a commutator 20 on which the carbon brush 2 slides. The carbon brush 2 includes a lower resistivity layer 4 that extends from the front end 5 to a central portion along the sliding direction and a higher resistivity layer 6 from the central portion to the rear end 9 along the sliding direction. A lead wire 8 is attached to the lower resistivity layer 4. The thickness ratio of the lower resistivity layer 4 and the higher resistivity layer 6 is preferably 10:1 to 2:1, for example, and the front end 5 along the sliding direction (the front end) and the rear end 9 along the sliding direction (the rear end) of the carbon brush are cut in conformity with the radial direction of the commutator 20.

The commutator 20 is circular and disk-like. Its sliding surface in the front surface of the commutator 20 is made of carbon, for example, and the commutator is cut into a plurality of segments 22 along the circumferential direction. Gaps 24 are provided between the segments 22, and 26 denotes a center hole. The rotation direction of the commutator 20 is indicated by the white arrow in FIGS. 1 and 2. Relative to the carbon brush 2, the direction parallel to the rotation direction (the circular direction) is denoted as an x-direction, the direction extending along the sliding surface 23 of the commutator and perpendicular to the x-direction is denoted as a y direction, and the direction orthogonal to the sliding surface 23 of the commutator is denoted as a z direction. The y-direction and the z-direction are both non-circular directions. The lower resistivity layer 4 and the higher resistivity layer 6 of the carbon brush 2 respectively have resistivities along the x-direction approximately four times higher than the resistivities along the y-direction and the z-direction, and the resistivities along the y-direction and the z-direction are the same basically. In the higher resistivity layer 6, the resistivity along the x direction is four times or higher than the resistivities along the y-direction and the z-direction and, for example, five times or higher. 29 denotes the rear end along the sliding direction of the segments 22.

In FIGS. 1 and 2, the higher resistivity layer 6 is just to remove from a segment 22a, and the lower resistivity layer 4 has come into contact with a segment 22b. Since the resistivity along the x direction is high, the resistance of the electrical current path from the segment 22a to the lower resistivity layer 4 via the higher resistivity layer 6 is high. Therefore, the electrical current flowing between the higher resistivity layer 6 and the segment 22a is reduced, and the occurrence of spark discharges is suppressed.

By making the resistivity of the higher resistivity layer 6 higher than the resistivity of the lower resistivity layer 4, the electrical current becomes to gradually decrease when the carbon brush 2 moves away from the segments 22, and thus, spark discharges are prevented. Generally, it is preferable that the resistivity of the lower resistivity layer 4 for a fuel pump motor is lower than or equal to 10,000 µΩ·cm, and is 2,000 µΩ·cm in the embodiment. Note that the resistivity means that along the non-circular direction unless otherwise noted. However, in the prior art, the prevention of spark discharges by laminated carbon brushes has not been considered, it has not been clear what is the adequate range for the resistivity of the higher resistivity layer 6 in order to prevent the spark discharges. Therefore, the inventors of the present invention manufactured laminated carbon brushes having various resistivities in the higher resistivity layers 6 in the following manner, and observed how the spark discharges occur.

Manufacturing of Carbon Brushes 92 mass % natural graphite having an average particle size of 30 µm, and 8 mass % thermoplastic resin (PPS) powder having an average particle size of 10 µm were mixed, the particle size distribution was adjusted, and thus a mixed powder for the lower resistivity layer having an average particle size of 100 µm was prepared. For the higher resistivity layer, a mixed powder comprising 56 mass % natural graphite having an average particle size of 30 µm, 8 mass % amorphous carbon having an average particle size of 70 µm, and phenol resin solution was prepared. The amount of phenol resin added was 8 mass % of the total amount of the higher resistivity layer material. 72 mass % of the above-described mixed powder, 4 mass % thermoplastic resin (PPS) powder having an average particle size of 10 µm, and 24 mass % talc powder having an average particle size of 10 µm were mixed, the particle size distribution was adjusted, and thus a mixed powder for the higher resistivity layer having an average particle size of 150 µm was obtained. Talc is an inorganic insulator, is stable in fuels such as gasoline and alcohol, has a low Mohs hardness, and is self-lubricating.

The amount of talc content in the higher resistivity layer was changed in order to change the resistivity, and thus mixed powders for the higher resistivity layers having various resistivities were obtained. Also, the amount of amorphous carbon content, the particle sizes of graphite and amorphous carbon, and so on were changed in order to change the resistivity of the higher resistivity layer. Further, mixed powders for the higher resistivity layer containing, instead of talc, molybdenum disulfide, tungsten disulfide, boron nitride, molybdenum trioxide, and mica were obtained. Although the resistivity may be adjusted by another method not changing the talc content, talc having a low hardness reduced the amount of wears of the brush and the commutator.

Figure 3:
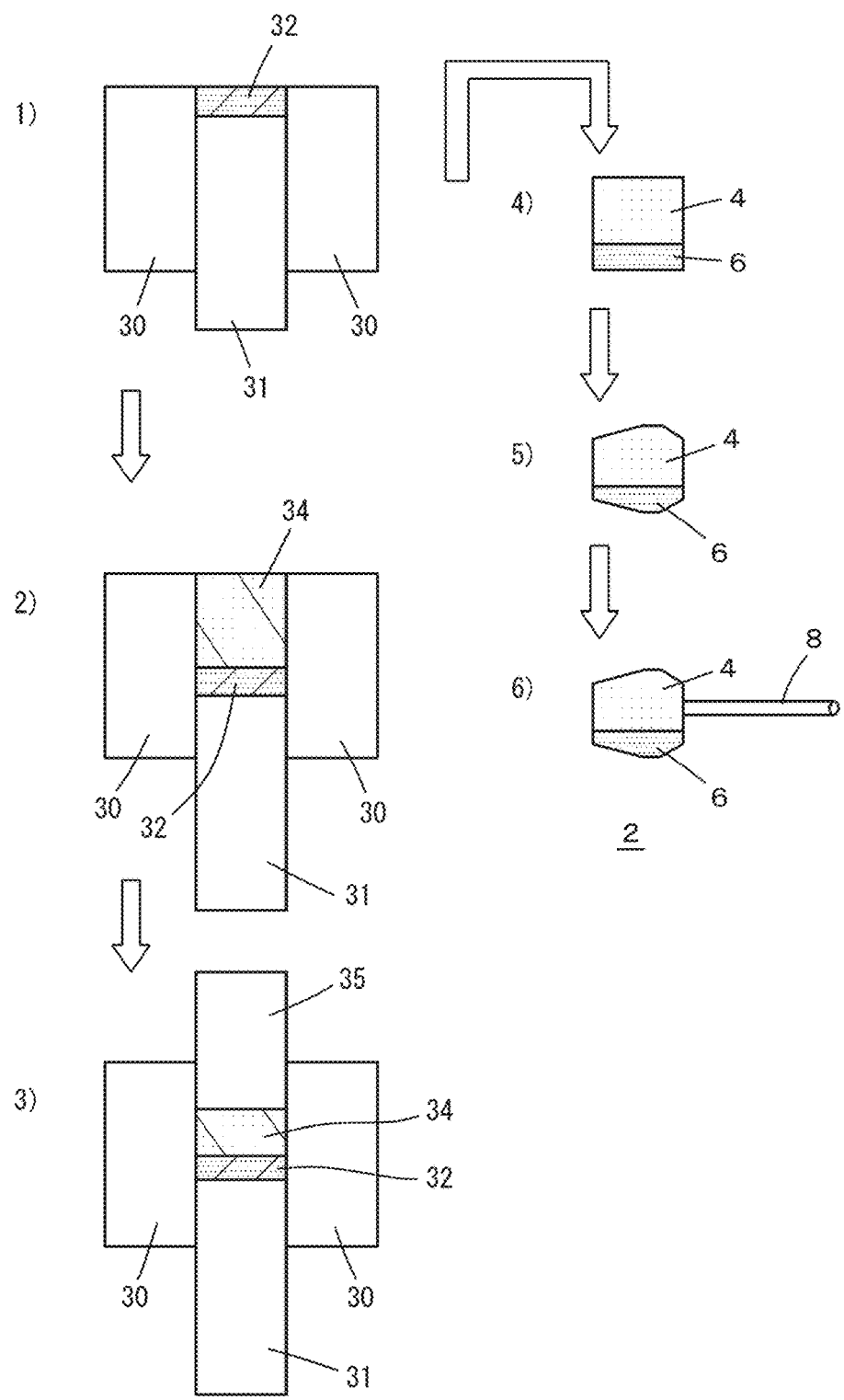
FIG. 3 is a diagram showing the manufacturing process of the laminated carbon brush for a fuel pump motor according to the embodiment, where 1) shows the filling of the higher-resistivity material, 2) shows the filling of the lower-resistivity material, 3) shows pressing, 4) shows thermal processing at a temperature higher than or equal to the melting point of the thermoplastic resin, 5) shows cutting, and 6) shows the attachment of a lead wire.

The carbon brush 2 was manufactured as shown in FIG. 3. A mold provided with a fixed mold 30 and a lower movable mold 31 was filled with a mixed powder 32 for the higher resistivity layer, then, a mixed powder 34 for the lower resistivity layer was filled above, and an upper movable mold 35 was lowered for compression molding. The direction of pressure was perpendicular to the interface between the mixed powder 32 for the higher resistivity layer and the mixed powder 34 for the lower resistivity layer. After compression molding, the molded pieces were heated to 300° C., which is higher than the melting point (280° C.) of PPS (the thermoplastic resin), and thus the material powders were combined by the PPS binder. Then, the molded pieces were shaped according to the shape of the commutator, the lead wire 8 was attached, and thus the carbon brush 2 was formed.

Test

The manufactured carbon brushes 2 were built into fuel pump motors and operated in a regular gasoline. To operate the fuel pump motors with high output powers and to make spark discharges easily occur, the fuel pump motors were operated for one hour by a DC power supply of 18 V, which was higher than the ordinary 12 V power supply. The resistivity (the non-circular directional resistivity) of the higher resistivity layer of the carbon brush 2 was changed within the range of 2000 μΩ·cm (the resistivity of a single layer brush having only the lower resistivity layer) to 235,000 μΩ·cm with changing the amount of talc content.

Spark noises were measured by a current probe and an oscilloscope, and the spark energies were calculated based on the waveform of the spark noises. Further, the sliding surfaces of the carbon brush (the contact surfaces with the commutator) after the test were observed. The amounts of wears of the carbon brushes and the amounts of wears of the commutators were measured. Within the tested range, the motor outputs were approximately constant, regardless of the resistivity of the higher resistivity layer.

Figure 4:
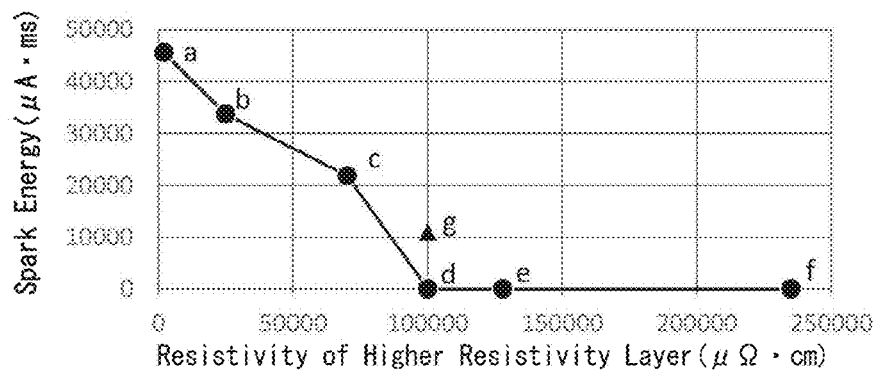
FIG. 4 is a characteristics diagram showing the energy of spark discharges generated between the laminated carbon brush and the commutator when the fuel pump motor is operated with a DC voltage of 18 V.

FIG. 4 and TABLE 1 show the results. When the resistivity of the higher resistivity layer 6 was lower than or equal to approximately 70,000 μΩ·cm, spark discharges occurred. However, when the resistivity of the higher resistivity layer 6 was higher than or equal to 100,000 μΩ·cm, no spark discharges occurred. Namely, the occurrence of spark discharges changed critically, according to the resistivities of the higher resistivity layer 6, between 70,000 μΩ·cm and 100,000 μΩ·cm.

Figure 5:
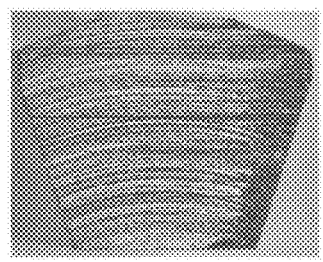
FIG. 5 is a photograph showing the sliding surface of a brush a after the test shown in FIG. 4.
Figure 6:
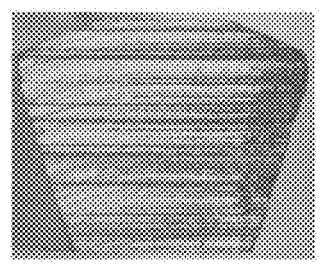
FIG. 6 is a photograph showing the sliding surface of a brush c after the test shown in FIG. 4.
Figure 7:
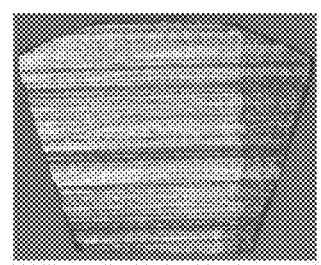
FIG. 7 is a photograph showing the sliding surface of a brush d after the test shown in FIG. 4.

The sliding surfaces of samples a, c, and d after the test are shown in FIGS. 5, 6, and 7. The sample a (FIG. 5) and the sample c (FIG. 6) had remarkably rough sliding surfaces at their rear ends. However, the sample d (FIG. 7) had a smooth sliding surface at the rear end, and wears by spark discharges were not observed. Furthermore, while spark discharges occurred on a sample g which had the high resistivity along the radial direction of the commutator by changing the press, no spark discharges occurred on the sample d having the same manufacturing conditions other than the press direction. This shows that spark discharges may be suppressed by increasing the resistivity along the circular direction.

content, or by other self-lubricants such as molybdenum disulfide, or additionally by the particle sizes or the like of graphite or the like.

LIST OF REFERENCE NUMERALS 2 laminated carbon brush for a fuel pump motor (carbon brush)
4 lower resistivity layer
5 front end along the sliding direction
6 higher resistivity layer
8 lead wire
9, 29 rear end along the sliding direction
20 commutator
22 segment
23 sliding surface
24 gap
26 center hole
30 fixed mold
31, 35 movable mold
32 mixed powder for the higher resistivity layer
34 mixed powder for the lower resistivity layer

What is claimed is:

1. A laminated carbon brush for a liquid pump motor sliding on a sliding surface of a disk-like commutator in a liquid fuel comprising:
   at least two layers of a lower resistivity layer and a higher resistivity layer,
   wherein regarding both the lower resistivity layer and the higher resistivity layer, circular directional resistivities of the brush along a circular direction in the rotation of the commutator are higher than non-circular directional resistivities of the brush along a radial direction of the commutator and along a perpendicular direction to the sliding surface of the commutator,
   and wherein a non-circular directional resistivity of the higher resistivity layer is higher than or equal to 90,000 μΩ·cm.

2. The laminated carbon brush for a liquid pump motor according to claim 1,

TABLE 1

| Proportion of talc content in higher resistivity layer | Resistivity of higher resistivity layer (in non-press direction) | Resistivity of higher resistivity layer (in press direction) | Spark energy (μA · ms) | Amount of wear of brush (mm) | Amount of wear of commutator (mm) | Sample |
|---|---|---|---|---|---|---|
| Single layer brush | 2000 | 10000 | 45589 | 0.22 | 0.05 | a |
| 5 | 25000 | 128000 | 33756 | 0.12 | 0.03 | b |
| 9 | 70000 | 369000 | 21888 | 0.05 | 0.01 | c |
| 18 | 100000 | 534000 | 0 | 0 | 0 | d |
| 24 | 128000 | 700000 | 0 | 0 | 0 | e |
| 40 | 235000 | 1290000 | 0 | 0 | 0 | f |
| 18 | 100000 | 534000 | 10896 | 0.04 | 0.01 | g |

*1 The unit of talc content is mass %.
*2 The unit of resistivity of the higher resistivity layer is μΩ · cm, and the resistivity along the non-press direction and the press direction is indicated.
*3 The unit of spark energy is μA · ms.
*4 The unit of the amount of wears of the brush and the commutator is mm.
*5 The sample g is a comparative example, where the press direction was made the y direction (non-circular direction) increase the resistivity. In other points, it is the same as the sample d.
*6 In the samples other than the sample g, the higher resistivity layer have resistivity along the circular direction approximately five times the resistivity along the non-circular direction.
*7 In each sample, the lower resistivity layer have the resistivity along the non-circular direction of 2000 μΩ · cm and the resistivity along the circular direction of 10000 μΩ · cm.

Note that when the press direction was the circular direction, no spark discharges occurred, if the resistivity of the higher resistivity layer was higher than or equal to 100,000 μΩ·cm, when the resistivity was adjusted by the talc wherein the higher resistivity layer contains an insulative inorganic layered compound.

3. The laminated carbon brush for a liquid pump motor according to claim 2, wherein the higher resistivity layer contains an insulative self-lubricating inorganic layered compound as the insulative inorganic layered compound.

4. The laminated carbon brush for a liquid pump motor according to claim 2,
wherein the higher resistivity layer contains the insulative inorganic layered compound in an amount of no less than 10 mass % and no greater than 70 mass %.

5. The laminated carbon brush for a liquid pump motor according to claim 2,
wherein the higher resistivity layer contains talc.

6. The laminated carbon brush for a liquid pump motor according to claim 1,
wherein both the lower resistivity layer and the higher resistivity layer contain at least a thermoplastic resin.

7. The laminated carbon brush for a liquid pump motor according to claim 2,
wherein both the lower resistivity layer and the higher resistivity layer contain at least a thermoplastic resin.

8. The laminated carbon brush for a liquid pump motor according to claim 1,
wherein the non-circular directional resistivity of the higher resistivity layer is lower than or equal to 800,000 $\mu\Omega \cdot cm$.

9. The laminated carbon brush for a liquid pump motor according to claim 8,
wherein the circular directional resistivity of the higher resistivity layer is lower than or equal to 4,000,000 $\mu\Omega \cdot cm$.

10. The laminated carbon brush for a liquid pump motor according to claim 1,
wherein the non-circular directional resistivity of the lower resistivity layer is lower than or equal to 10,000 $\mu\Omega \cdot cm$.

11. The laminated carbon brush for a liquid pump motor according to claim 9,
wherein the circular directional resistivity of the lower resistivity layer is lower than or equal to 50,000 $\mu\Omega \cdot cm$.

12. The laminated carbon brush for a liquid pump motor according to claim 1,
wherein the commutator is circular and disk-like, and the sliding surface of the commutator is circular.

\* \* \* \* \*